United States Patent
Mantravadi et al.

(10) Patent No.: US 8,509,325 B2
(45) Date of Patent: Aug. 13, 2013

(54) ADAPTIVE THRESHOLDING FOR OFDM CHANNEL ESTIMATION

(75) Inventors: Ashok Mantravadi, San Diego, CA (US); Krishna Kiran Mukkavilli, San Diego, CA (US); Raghuraman Krishnamoorthi, San Diego, CA (US); Rajeev Krishnamurthi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1184 days.

(21) Appl. No.: 12/250,135

(22) Filed: Oct. 13, 2008

(65) Prior Publication Data
US 2010/0002785 A1 Jan. 7, 2010

Related U.S. Application Data

(60) Provisional application No. 61/077,173, filed on Jul. 1, 2008.

(51) Int. Cl.
*H04L 27/28* (2006.01)

(52) U.S. Cl.
USPC ............ 375/260; 375/316; 375/259; 370/208

(58) Field of Classification Search
USPC ..................... 375/260, 316, 259; 370/208
See application file for complete search history.

(56) References Cited

U.S. PATENT DOCUMENTS

| | | | |
|---|---|---|---|
| 6,744,893 B1 * | 6/2004 | Fleming-Dahl | ............... 380/263 |
| 2002/0159425 A1 | 10/2002 | Uesugi et al. | |
| 2003/0016740 A1 | 1/2003 | Jeske et al. | |
| 2004/0194134 A1 | 9/2004 | Gunatilake et al. | |
| 2005/0122928 A1 * | 6/2005 | Vijayan et al. | ............... 370/312 |
| 2006/0018411 A1 | 1/2006 | Gore et al. | |
| 2006/0039475 A1 | 2/2006 | Liu et al. | |
| 2006/0140297 A1 * | 6/2006 | Maltsev et al. | ............... 375/260 |

(Continued)

FOREIGN PATENT DOCUMENTS

| | | |
|---|---|---|
| CN | 1898887 A | 1/2007 |
| CN | 101019389 A | 8/2007 |
| CN | 101208874 A | 6/2008 |
| EP | 1 372 338 A1 | 12/2003 |
| WO | 2006096784 | 9/2006 |

OTHER PUBLICATIONS

International Search Report, PCT/US2009/049335, International Searching Authority, European Patent Office, Nov. 12, 2009.
Written Opinion, PCT/US2009/049335, International Searching Authority, European Patent Office, Nov. 12, 2009.
International Search Report & Written Opinion—PCT/US2007/078922, International Search Authority—European Patent Office—Dec. 1, 2009.
Taiwan Search Report—TW098122287—TIPO—Oct. 11, 2012.

*Primary Examiner* — Leila Malek
(74) *Attorney, Agent, or Firm* — Fulbright & Jaworski LLP

(57) ABSTRACT

An adaptive thresholding technique eliminates suboptimum threshold values by adjusting for varying channel conditions to eliminate interference where no channel energy is present, without discarding viable taps having useful channel energy. The adaptive thresholding technique adaptively optimizes receive threshold values for both wide and local area channels based only on measured C/I ratios 300. Thresholds are calculated based on instantaneous C/I estimates and/or weighted average C/I estimates calculated from WID/LID energies obtained from the current superframe WIC/LIC symbols respectively. In alternate embodiments, thresholds are calculated based on instantaneous C/I estimates and/or weighted average C/I estimates calculated from WTPC and LTPC symbols for the wide and local area channels, respectively The present adaptive thresholding technique dynamically reduces the threshold as the C/I estimate increases to mitigate performance degradation due to removal of weak signal taps. There is a separate threshold for each of the 12 coding and modulation modes supported by an exemplary receiver.

18 Claims, 7 Drawing Sheets

(56) References Cited

U.S. PATENT DOCUMENTS

| | | |
|---|---|---|
| 2007/0006080 A1 | 1/2007 | Finger et al. |
| 2007/0070963 A1* | 3/2007 | Li et al. .......... 370/338 |
| 2007/0130393 A1 | 6/2007 | Versteeg |
| 2007/0133668 A1 | 6/2007 | Naguib et al. |
| 2007/0153924 A1 | 7/2007 | Ling et al. |
| 2008/0130730 A1* | 6/2008 | Chapman et al. .......... 375/227 |
| 2008/0232236 A1 | 9/2008 | Liu |
| 2010/0027688 A1 | 2/2010 | Suh et al. |

* cited by examiner

ADAPTIVE THRESHOLDING FOR OFDM CHANNEL ESTIMATION

CLAIM OF PRIORITY UNDER 37 U.S.C. §119

The present Application for patent claims priority to Provisional Application No. 61/077,173 entitled "Adaptive Thresholding Implementation In UBM1 SW" filed Jul. 1, 2008, and assigned to the assignee hereof and hereby expressly incorporated by reference herein.

BACKGROUND

1. Field

The present invention relates generally to data communications, and more specifically to techniques for optimizing channel estimation in an orthogonal frequency division multiplexing (OFDM) communication system.

2. Background

OFDM is a multi-carrier modulation technique that effectively partitions the overall system bandwidth into multiple (N) orthogonal subbands. These subbands are also referred to as tones, subcarriers, bins, and frequency channels. In an OFDM communication system, each subband is associated with a respective subcarrier that may be modulated with data.

In a wireless communication system, a radio frequency (RF) modulated signal may travel via a number of signal paths from a transmitter to a receiver. If the signal paths have different delays, then the signal arriving at the receiver would include multiple instances of the transmitted signal with different gains and delays. This time dispersion in the wireless channel causes frequency selective fading, which is characterized by a frequency response that varies across the system bandwidth. In an OFDM system, the N subbands may thus experience different effective channels and may consequently be associated with different complex channel gains.

An accurate estimate of the wireless channel between the transmitter and the receiver is normally needed in order to effectively receive data on the available subbands. Channel estimation is typically performed by sending a pilot from the transmitter and measuring the pilot at the receiver. Since the pilot is made up of modulation symbols that are known a priori by the receiver, the channel response can be estimated as the ratio of the received pilot symbol over the transmitted pilot symbol for each subband used for pilot transmission.

In order to obtain a reliable channel estimate and extract data from a particular channel, channel signal energy must be reliably distinguished from interference energy in the channel estimate by a process referred to as "thresholding". A thresholding process uses a threshold to determine whether a given channel element, or tap, has sufficient channel energy to be retained, or has insufficient energy and should be discarded, or zeroed out. If the energy in a channel is above the threshold, it is retained as channel energy. If the energy is below the threshold it may be discarded as.

Thresholds are known to be computed based on various factors and in various manners. Traditionally, the threshold can be applied to the channel estimate after Automatic Gain Control (AGC). The AGC operation scales the received signal such that the sum of channel energy and interference energy is kept fixed. The threshold can then be a fixed value for each data mode and can be computed based on the total or average energy of the channel response estimate after AGC. The use of the fixed threshold ensures that (1) the thresholding is not dependent on variations in the received energy before AGC and (2) the channel taps that are present but with low signal energy are not zeroed out. An absolute, or fixed, threshold can be computed based on the signal to interference ratio (C/I) required for a given data mode, the lowest energy expected for the received pilot symbols, and so on. The use of the fixed threshold forces the tap to meet some minimum value in order to be retained. The threshold can also be computed based on a combination of factors. For example, the threshold can be computed based on the energy of the channel impulse response estimate and further constrained to be equal to or greater than a predetermined minimum value.

The use of fixed thresholding techniques in OFDM systems is disclosed in U.S. patent application Ser. No. 10/741, 524, entitled "CHANNEL ESTIMATION FOR AN OFDM COMMUNICATION SYSTEM WITH INACTIVE SUBBANDS," assigned to the assignee of the present invention and incorporated by reference herein. The use of fixed thresholding techniques in OFDM systems is further disclosed in U.S. patent application Ser. No. 11/366,779, entitled "CHANNEL ESTIMATE OPTIMIZATION FOR MULTIPLE TRANSMIT MODES", assigned to the assignee of the present invention and incorporated by reference herein. Additional details on a method for obtaining relative WIC based C/I measurements for deriving set relative thresholds are described in U.S. patent application Ser. No. 11/516, 910 entitled "METHODS AND APPARATUS FOR NOISE ESTIMATION IN A COMMUNICATION SYSTEM", assigned to the assignee of he present invention, and incorporated by reference herein. C/I measurements for deriving set relative thresholds may be further obtained during data symbol processing as described in U.S. patent application. Ser. No. 11/563,627 111, entitled "METHODS AND APPARATUS FOR SIGNAL AND INTERFERENCE ENERGY ESTIMATION IN A COMMUNICATION SYSTEM," assigned to the assignee of the present invention, the disclosure of which is also incorporated by reference herein.

Traditionally determined thresholds may be suboptimum because they do not dynamically accommodate changing channel conditions. When thresholds are arbitrarily fixed by mode (data rate) and changing channel conditions become better than expected, channel taps below the traditional threshold may be discarded when they could be retained. Removing viable channel taps then creates interference in the channel. As new generations of OFDM communication systems are deployed, signal differences between wide and local area channels must also be accommodated for by thresholding techniques.

There is therefore a need in the art for an adaptive thresholding technique, which eliminates suboptimum threshold values by adjusting for varying channel conditions to eliminate interference where no channel energy is present, without discarding viable taps having useful channel energy. New thresholding techniques must also adaptively optimize threshold values for both wide and local area channels.

DETAILED DESCRIPTION

The word "exemplary" is used herein to mean "serving as an example, instance, or illustration." Any embodiment described herein as "exemplary" is not necessarily to be construed as preferred or advantageous over other embodiments.

The symbol "C" is used herein to mean the total signal energy in an OFDM channel.

The symbol "I" is used herein to mean interference energy in an OFDM channel from thermal noise and any other additional in-band noise that may be present in the environment.

In one or more aspects, receiver adaptive thresholding is provided that operates to assist in channel estimation in a communication network. For the purpose of this description, aspects of the adaptive thresholding process are described herein with reference to a communication network utilizing OFDM to provide communications between network servers and one or more mobile devices. For example, in an aspect of an OFDM system, a server transmits a transmit waveform that comprises a transmission frame having multiplexed wide area and local data flows with a particular arrangement, sequence, interleaving, and/or other encoding of real-time and/or other than real-time data. The data is represented as symbols where each symbol comprises N sub-carriers.

Figure 1:
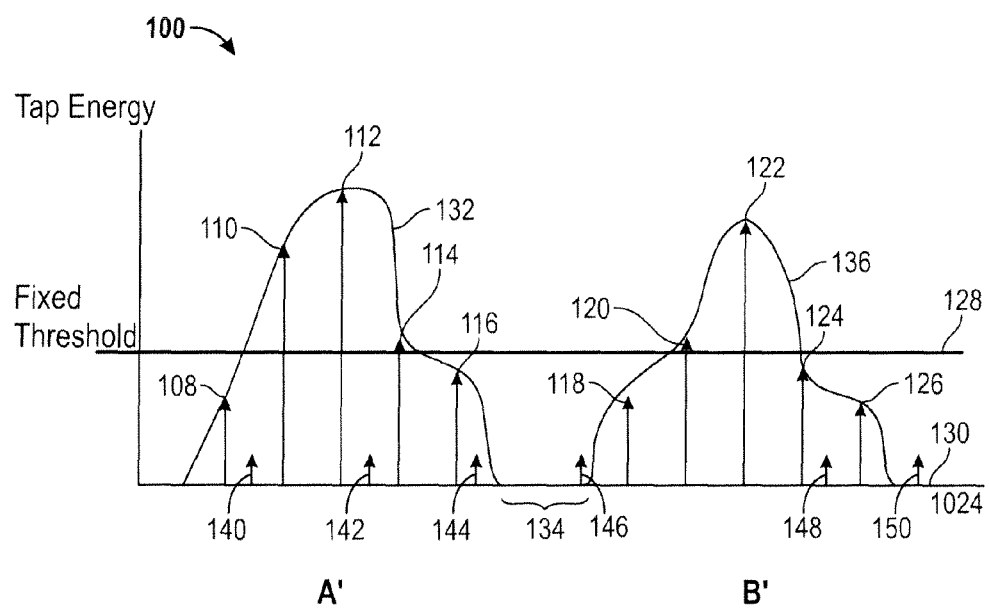
FIG. 1 (Prior Art) shows an exemplary fixed thresholding process.
Figure 1:
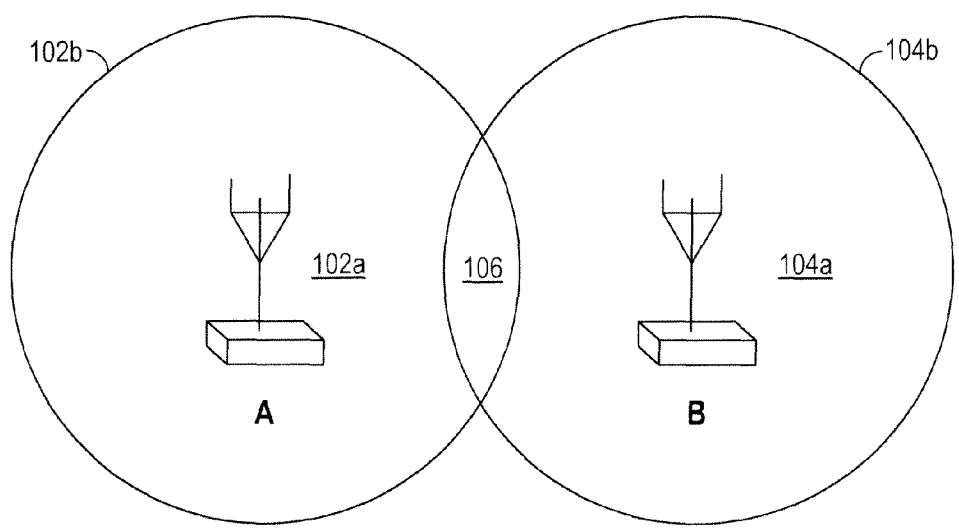

As described below, the adaptive thresholding process is operable to assist in channel estimation so that receiving devices are able to accurately decode the wide and local area data flows. The system is well suited for use in wireless communication networks, but may be used in any type of wireless environment, including but not limited to, public networks, such as the Internet, private networks, such as virtual private networks (VPN), local area networks, wide area networks, long haul networks, or any other type of wireless network FIG. 1 illustrates an exemplary traditional fixed thresholding process 100, which may use suboptimum thresholds under various channel conditions. In multiple transmitter systems, two or more transmitters may transmit duplicate information. FIG. 1 shows a two transmitter system for reason of simplicity. Transmitter A 102a, having signal coverage area 102b and transmitter B 104a, having signal coverage area 104b with overlapping signal coverage area 106, transmit identical information. At a receiver (Detailed in FIG. 7), one signal is usually, but not always, stronger than the other.

Received channel estimate impulse responses (108-126), or taps/chips, comprise energy levels at 1024 taps per OFDM symbol. Impulse response cluster A' 132 received from transmitter A 102a and impulse response cluster B' 136 received from transmitter B 104a are typically separated by a gap 134 due to differences in each signal's path from its respective transmitter to the receiver. The chips comprise channel taps having relatively large energy levels, which typically contain channel signal energy (C) as well as taps having relatively smaller energy levels, which typically indicate interference energy from thermal noise and any other additional in-band noise that may be present in the environment (I).

Channel signal energy can be located anywhere in the OFDM symbol. The purpose of the thresholding process is to isolate the taps with channel energy from the taps with no channel energy, i.e. interference, and then discard the taps with no channel energy. Fixed threshold 128 separates taps having largely interference energy from taps having largely signal energy. Taps with energy levels above or equal to (110, 112, 114, 120, 122) the threshold 128 are determined to have signal energy and are processed accordingly by the receiver. Energy levels below the threshold (108, 116, 118, 124, 126, 140-170) are determined to be interference.

The benefit of the thresholding process is a better channel estimate because interference has been suppressed. Previous thresholding techniques define mode dependent thresholds. Because data is transmitted at different efficiencies/data rates, (modes) on different subcarriers, some modes are more robust than other modes and can sustain more interference. The threshold 128 is chosen depending on the mode being decoded. The mode is known a priori by the receiver and for each mode there is a fixed threshold. For example, mode 0, transmitted at 2 Megabits per second (Mbps) may require a C/I ratio of 3 decibels (dB), while mode 4, transmitted at 8 Mbps may require a C/I ratio of 15 dB. Based on the C/I, the interference level 130 tolerated by the channel for decoding a given mode is known by the receiver. Higher data rates operate at lower interference, thus, the threshold 128 will be lower for a higher data rate mode than the threshold 128 for a lower data rate mode. However, due to varying field conditions, the actual C/I could be even better than 15 dB for mode 4. In such a scenario, the interference level 130 would be even lower and weak channel taps would stand out more compared to the background interference. If thresholds are fixed regardless of channel conditions and the channel condition is better than a modeled expectation, the fixed threshold 128 would be a suboptimum threshold since it causes some weak channel taps (108, 116, 118, 124, 126) to be discarded. When the threshold is lowered under these circumstances, weak channel taps under the threshold are included rather than being discarded as interference (140-170). Ideally, the threshold 128 should be adaptively adjustable such that it is set as low as possible to remove all of the interference (140-170) without discarding out any channel taps in consideration of current channel conditions.

Figure 2:
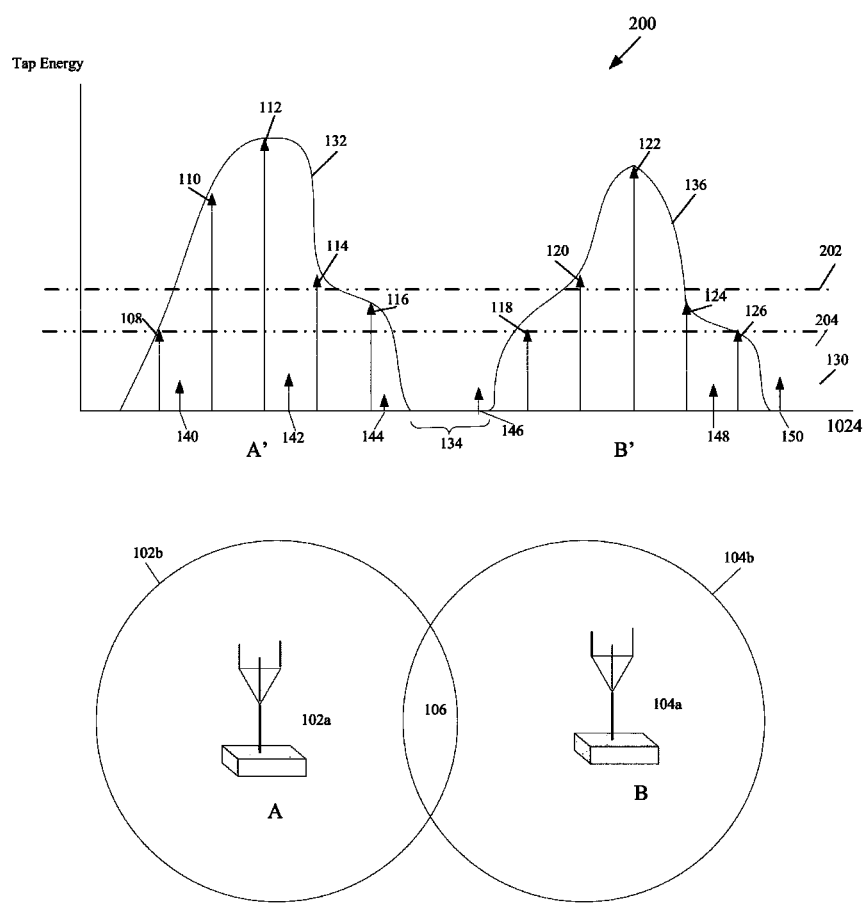
FIG. 2 shows an exemplary adaptive thresholding process.

FIG. 2 illustrates an exemplary adaptive thresholding process 200 whereby thresholds are dynamically adjusted in consideration of current channel conditions. For example, a mode 4 8 Mbps signal uses the higher threshold (202) at a C/I of 15 dB. Channel taps having relatively smaller energy levels (108, 116, 118, 126) and channel taps having no channel energy (140-170) are below the threshold. Discarding taps 108, 116, 118 and 126 having some actual channel energy creates interference in the received signal. Upon improvement of conditions for the received channel profile, the adaptive thresholding process 200 dynamically adjusts to the lower threshold 204. After adaptively adjusting for actual channel conditions, all channel taps having signal energy including taps 108, 116, 118 and 126 are below the threshold 202 and retained in the received signal.

Thus, the interference caused by dropped channel energy is eliminated, while actual interference taps (140-170) are properly discarded. Exemplary methods and apparatus for implementing adaptive thresholding 200 techniques are detailed in FIGS. 3-7.

Figure 3:
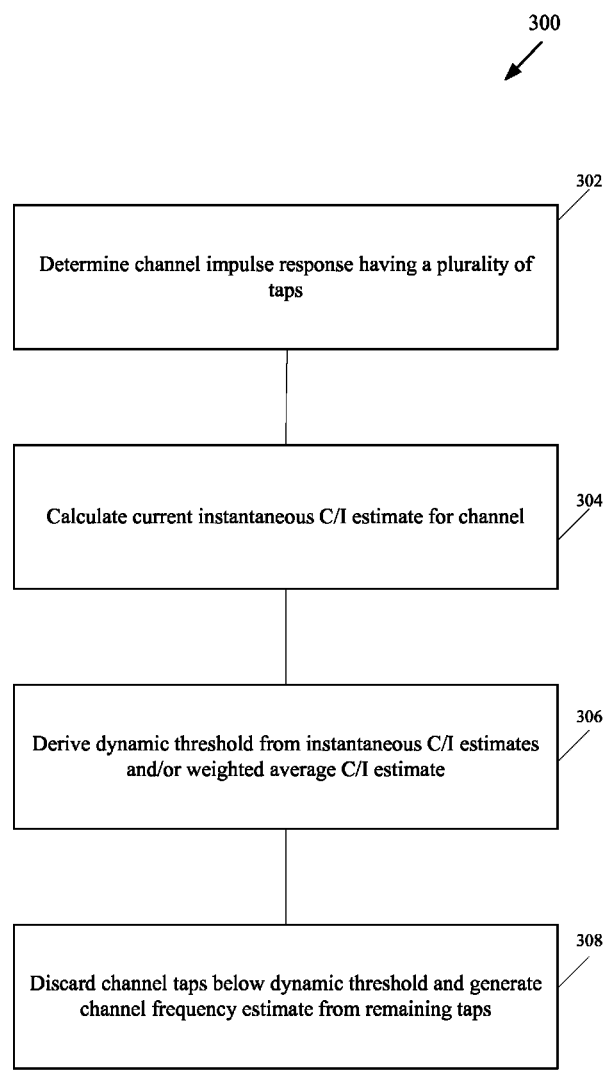
FIG. 3 shows an exemplary high level overview of a method for an adaptive thresholding process.

FIG. 3 shows an exemplary high level overview of a method for an adaptive mode independent thresholding process based only on measured C/I ratios 300. In one aspect, the adaptive thresholding process 300 involves dynamically adjusting the thresholds stored in receiver hardware registers (threshold registers) based on instantaneous C/I estimates and/or weighted average C/I estimates calculated from wide area identifier/local area identifier (WID/LID) energies obtained from the current WIC/LIC symbols respectively. The present adaptive thresholding technique dynamically reduces the threshold as the C/I estimate increases to mitigate performance degradation due to removal of weak signal taps. An adaptive threshold is derived from the C/I estimate and channel matching is verified for the instantaneous C/I calculation as detailed below.

The threshold registers are initialized with default values at the time the receiver is powered up. Remaining processing for adaptive thresholding occurs in response to periodic interrupts, e.g once every second. In step 302, a channel impulse response having a plurality of taps as illustrated in FIGS. 1-2 is determined. Control flow proceeds to step 304.

In step 304, occurring on each of the periodic interrupts, an instantaneous C/I estimate is calculated. The C/I value may be calculated from a dedicated instantaneous WIC symbol, WIC symbol averages over time, pilot symbols, pilot symbols averaged over time, or a combination of these methods.

In one aspect, the instantaneous C/I estimate is calculated using the time domain channel estimate or frequency domain pilot observations from the Frequency Divison Multiplexed (FDM) pilots in the data symbols. In other aspects, time domain channel estimates or frequency domain pilot observations from the Transition Pilot Channel (TPC) symbols are used to calculate instantaneous C/I estimates. C/I may also be estimated from the various other Time Division Multiplexed (TDM) pilot symbols such as TDM1 and TDM2, or Position Pilot Channel (PPC) symbols. Combining C/I estimates from time domain channel estimates or frequency domain pilot observations from the FDM pilots in the data symbols and time domain channel estimates or frequency domain pilot observations from TPC symbols produces a reliable C/I estimate even in the presence of self interference. Furthermore, a separate weighted C/I estimate for all desired and interfering wide and local area channels can be obtained using these two methods. In yet other aspects, the instantaneous C/I estimates obtained by each of the above methods may be combined to form a single estimate by means of weighted averaging to increase the reliability of the estimate and obtain better interference averaging. Control flow proceeds to step 306.

In step 306, in one aspect, the dynamic threshold is derived from the instantaneous C/I estimate. In one aspect, the C/I estimate is obtained from the wide-area identification channel (WIC) as a scaled ratio of the total channel energy to the interference energy (C/I). The WIC symbol consists of one interlace (i.e. 700 sub-carriers) that has signal as well as interference energy, while other interlaces contain only interference. The energy of the interlace with signal energy ($\sigma_s^2$) and interference ($\sigma_n^2$) is given by $$P_0 = 2\sigma_s^2 + \frac{\sigma_n^2}{2}$$

and the energy of an interlace corresponding to interference is given by $$P_4 = 4\sigma_n^2.$$

Where the scale factors of 2, ½ and 4 are specific to the WIC symbol processing scheme. The C/I can then be computed as follows:

$$C/I = \frac{2P_0 - P_4}{4P_4}$$

In another aspect, the dynamic threshold is derived from the instantaneous C/I estimate described above and a weighted average C/I estimate or, a weighted average C/I estimate only.

Channel matching may be verified for the instantaneous C/I estimate to differentiate C/I estimates for wide and local area channels. In one aspect, a one second OFDM superframe is divided into four frames. Each of the four frames is divided into two portions for a wide and a local area signal path. One wide area can be divided into multiple local areas. Referring to FIG. 1, it is possible that Transmitter A 102*a* and Transmitter B 104*a* could belong to the same wide area (transmitting duplicate content) but different local areas (transmitting different content). For identical wide area transmissions impulse response cluster A' 132 received from transmitter A 102*a* and impulse response cluster B' 136 received from transmitter B 104*a* can be combined. With respect to the local areas, the content is different, so cluster A' 132 and cluster B' 136 are interfering with each other, are not additive, and cannot be combined. In other words, when both channels belong to the same wide area network, both portions of the frame are identical and the signals are additive. When the signals aid each other in this manner, channel conditions are improved. By contrast, in differing local areas, the signals are interfering and cannot be added.

Therefore, it is disadvantageous to set the threshold for a wide area based on the local C/I estimate or vice versa. If such channel matching cannot be verified, the dynamic threshold may not include the instantaneous C/I estimate calculated for the current superframe. Alternately, transition pilot channels on frame boundaries may be used to calculate separate C/I estimates from the wide and local channels. Control flow proceeds to step 308.

In step 308, channel taps below the dynamic threshold are zeroed out or discarded. A channel estimate is generated from the remaining taps.

Figure 4:
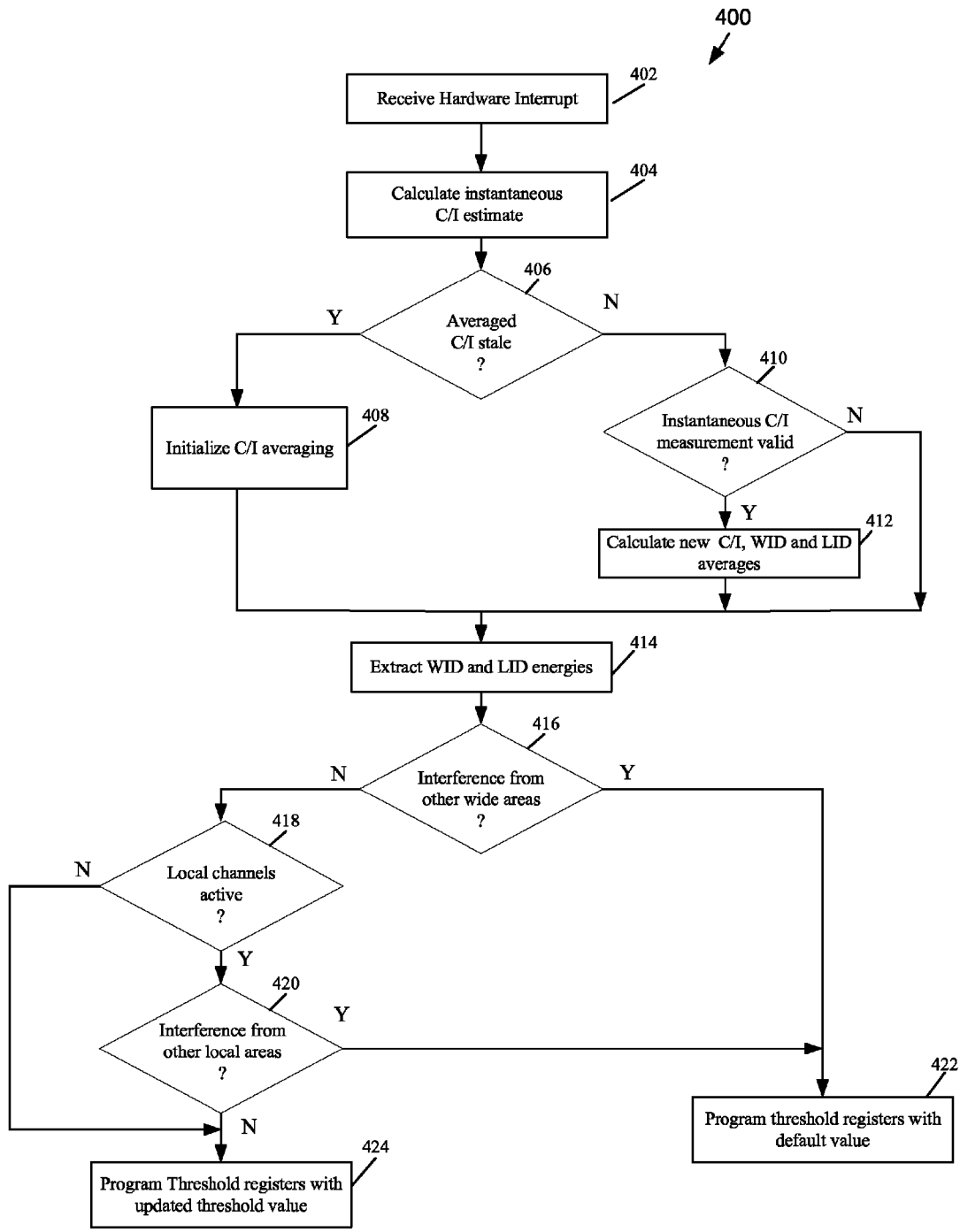
FIG. 4 shows an exemplary detailed method for an adaptive thresholding process optimizing threshold values for both wide and local area channels based on WIC symbols.

FIG. 4 shows an exemplary detailed WIC based method for an adaptive thresholding process dynamically optimizing threshold values for both wide and local area channels 400. In step 402, a hardware interrupt indicates availability of new instantaneous channel estimation information. In one aspect, the hardware interrupt indicates the availability of the WIC OFDM symbol in a superframe. In other aspects, the hardware interrupt may correspond to TPC or PPC symbols. Control flow proceeds to step 404.

In step 404, an instantaneous C/I estimate is calculated for the channel having availability of new channel estimation information. The C/I estimate is an instantaneous estimate of the energy in the channel at the time the superframe was received. The instantaneous C/I estimate may be calculated as detailed in FIG. 3. Control flow proceeds to step 406.

In step 406, the current C/I average produced from previously calculated instantaneous C/I estimates is validated in time to ensure freshness. In one aspect, if the instantaneous C/I estimate calculated in step 404 is the first estimate after power-up or the difference between the current superframe time ($t_n$) and the time corresponding to the last superframe ($t_{n-1}$) is greater than a staleness threshold ($\delta$), the current C/I average is deemed stale due to the likelihood of changed channel conditions. The current C/I average may be stale if $$t_n t_{-n-1} > \beta.$$

In one aspect, β=5 seconds by default. If the current C/I average is stale, control flow proceeds to step 408 where the current C/I average is reset. Otherwise, control flow proceeds to 410 for further processing of the instantaneous C/I estimate.

In step 410, the instantaneous channel estimation energy information obtained in step 402 is validated against a total interference threshold to ensure it does not contain energy from interfering transmitters. If the channel estimate is valid, i.e. contains insignificant interfering energy, control flow proceeds to step 412 where the instantaneous C/I estimate is included in the current C/I average. Otherwise, the C/I estimate is not included in the current C/I average and control flow proceeds to step 414.

In step 412, the instantaneous C/I estimate is included in the current average C/I. In one aspect, the current C/I average is calculated as $$C/I_{avg,new} = (1-\beta) \times C/I_{avg,old} + \beta \times C/I$$

where, β is a programmable weighting parameter that takes on values between 0 and 1 depending on the reliability of the instantaneous C/I estimate.

Maintaining a weighted C/I average is advantageous because the instantaneous C/I estimate derived from the WIC symbol cannot reflect channel condition variations within the duration of the superframe. Here, we have an instantaneous measurement for C/I for the current superframe and a C/I average value accumulated over multiple superframes. β is the amount of weight placed on the instantaneous C/I measurement, or the amount of confidence in the instantaneous C/I measurement. If the instantaneous C/I measurement is associated with a very high level of certainty, β is equal to 1 so that no weight is placed on the historical C/I average. When β is equal to 1, the operational C/I estimate is the instantaneously measured C/I estimate. As the value of β is lowered, more emphasis (or weight) is placed on the previous values of C/I.

In one aspect, β is an adaptable parameter adjusted for the prevailing conditions. If the receiver is operating in a static environment, for example a user sitting in a room or watching a video, the field array is not changing between instantaneous C/I measurements and β will be adjusted to have a value near 1. By contrast, if a user is driving in a car, the receiver is moving through different coverage regions of the network, coming closer to one transmitter and then away, β will be adjusted to a lower value placing more weight on the C/I average. Thus, adaptively adjusting β compensates for fading, and multi-path when moving or when confidence in the instantaneous C/I measurement is low. When a receiver is moving, the instantaneous C/I estimate will depend upon the particular channel condition at the time of estimation and may not accurately reflect the actual general condition of the channel than others. The average C/I value is then more robust than using one instantaneous C/I estimate throughout the entire superframe second. One bad channel measurement may be received, but if the channel condition improved within the superframe second, weighted C/I averaging prevents a large hit in performance by minimizing variations.

Current secondary WID and LID average energies (WID_ERG$_{avg}$ and LID_ERG$_{avg}$ respectively) of interfering transmitters are then updated with instantaneous energy measurements weighted by γ in the same manner as the current C/I average calculation where:

$$WID_{average\ energy,new} = (1-\gamma) \times WID_{average\ energy,old} + \gamma WID_{instantaneous\ energy}$$

and $$LID_{average\ energy,new} = (1-\gamma) \times LID_{average\ energy,old} + \gamma LID_{instantaneous\ energy}$$

In one aspect, the default value of β and γ is 0.27. However, an independent adaptable calculation for γ is also desirable for averaging the secondary WID and the LID energies. Control flow proceeds to step 414.

In step 414, individual primary instantaneous wide and local area channel energies (WID,LID) are extracted from the received WIC and LIC symbols respectively. Control flow proceeds to step 416.

In step 416, the secondary average WID energy calculated in step 412 is compared to a WID interference threshold to ensure that the secondary energy has been generated by a transmitter in the same wide area network as the channel of interest indicating no interference from other wide areas. If there significant interference from other wide areas, control flow proceeds to step 424, where the threshold registers are reset to default values. Otherwise control flow proceeds to step 418.

In step 418, the LID energy derived in step 414 is examined for the presence of local channel activity. If the local channel is not active, control flow proceeds to step 422. Otherwise, control flow proceeds to step 424.

In step 420, the secondary average LID energy calculated in step 412 is compared to a LID interference threshold to ensure that the secondary LID energy has been generated by a transmitter in the same local area network as the channel of interest indicating no interference from other local areas. If there is significant interference from other local areas, control flow proceeds to step 422, where the threshold registers are reset to default values. Otherwise control flow proceeds to step 424.

In step 424, channel energy thresholds are dynamically adjusted in consideration of current channel conditions. In one, aspect for simplicity of implementation, thresholds are selected from a look up table based on the current C/I average. An exemplary lookup table for loading the threshold registers is shown as:

TABLE 1

Look up table for choosing threshold based on Average C/I

| C/I$_{avg}$ > | But C/I$_{avg}$ <= | Threshold (Hex) |
|---|---|---|
| 0 | 2 | FF |
| 2 | 6 | DC |
| 6 | 16 | 64 |
| 16 | 40 | 2A |
| 40 | 100 | 11 |
| 100 | 270 | 07 |
| 270 | ∞ | 03 |

In other aspects, thresholds are selected from a look up table based on the instantaneous C/I estimate. In yet another aspect, thresholds are selected based on a weighted combination of the current C/I average and the instantaneous C/I estimate. Finally, the adaptable calculation parameters are also dynamically adjusted. Adaptable calculation parameters comprise δ, β, γ and the interference thresholds.

In step 408, which is reached if the current C/I average was deemed stale in step 406, current C/I average values is reset.

The current C/I average is initialized to equal the instantaneous C/I estimate calculated in step 404. Secondary WID and LID average energy values are reset to default values. Control flow resumes at step 414.

In step 422, which is reached if excessive wide area interference was found in step 416 or excessive local interference was found in step 420, channel energy threshold values are reset with default values.

One skilled in the art will understand that ordering of steps illustrated in FIGS. 3-4 is not limiting. The method is readily amended by omission or re-ordering of the steps illustrated without departing from the scope of the disclosed aspects.

Figure 5:
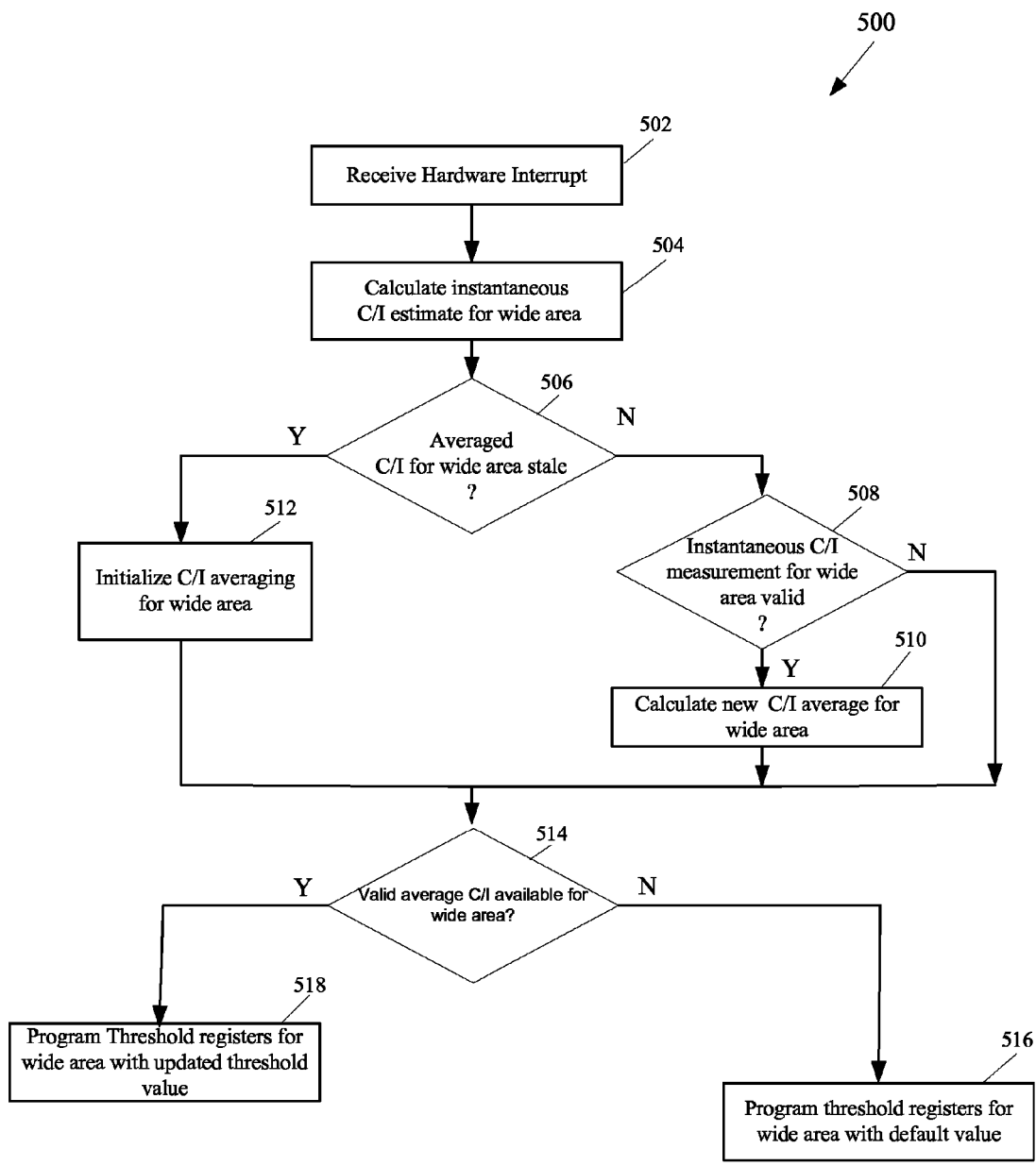
FIG. 5 shows an exemplary detailed method for an adaptive thresholding process optimizing threshold values for a wide area channel based on TPC symbols.

FIG. 5 shows an exemplary detailed method for an adaptive thresholding process optimizing threshold values for a wide area channel based on Wide-area transition pilot channel (WTPC) OFDM symbols. In step 502, a hardware interrupt indicates availability of new instantaneous channel estimation information. In an aspect, the hardware interrupt indicates the availability of a WTPC symbol in a superframe. Control flow proceeds to step 504.

In step 504, an instantaneous C/I estimate for the wide area is calculated at the time the WTPC OFDM symbol was received. In one aspect, the accumulated energy of the taps inside a sliding window of length W taps is computed. The minimum accumulated energy over all the positions of the sliding window is taken to correspond to interference. The instantaneous wide C/I estimate may then be calculated as $$I = a \sum_{n=n_0}^{n_0+W-1} |h_n|^2$$

$$\frac{C}{I} = \frac{R}{I} - 1$$

where $|h_n|^2$ is the energy in n-th tap of the channel estimate, $n_0$ corresponds to the position of the window with the minimum accumulated energy, $\alpha$ is a scale factor and R is the total signal and interference energy as measured by the AGC. After the instantaneous wide C/I estimate is computed, Control flow proceeds to step 506.

In step 506, the current wide C/I average produced from previously calculated instantaneous wide C/I estimates is validated in time to ensure freshness. In one aspect, if the instantaneous wide C/I estimate calculated in step 504 is the first estimate after power-up or the difference between the current superframe time ($t_n$) and the time corresponding to the last superframe ($t_{n-1}$) is greater than a staleness threshold ($\delta$), the current wide C/I average is deemed stale due to the likelihood of changed channel conditions. The current C/I average may be stale if $$t_n - t_{n-1} > \delta.$$

In one aspect, $\delta=5$ seconds by default. If the current wide C/I average is stale, control flow proceeds to step 512 where the current wide C/I average is reset. Otherwise, control flow proceeds to 508 for further processing of the instantaneous wide C/I estimate.

In step 508, the instantaneous channel estimation energy information obtained in step 506 may be further validated further to ensure that the interference estimate (I) is non-zero. If the instantaneous wide C/I estimate is valid, control flow proceeds to step 510 where the instantaneous wide C/I estimate is included in the current wide C/I average. Otherwise, the wide C/I estimate is not included in the current wide C/I average and control flow proceeds to step 514.

In step 510, the instantaneous wide C/I estimate is included in the current average wide C/I. In one aspect, the current wide C/I average is calculated as $$C/I_{avg,new} = (1-\beta) \times C/I_{avg,old} + \beta \times C/I$$

where, $\beta$ is a programmable weighting parameter that takes on values between 0 and 1 depending on the reliability of the instantaneous wide C/I estimate. Maintaining a weighted wide C/I average is advantageous because the instantaneous wide C/I estimate derived from the WTPC symbol cannot reflect channel condition variations during the rest of the frame. Here, we have an instantaneous measurement for wide C/I for the current frame and a wide C/I average value accumulated over multiple frames. $\beta$ is the amount of weight placed on the instantaneous WIDE C/I measurement, or the amount of confidence in the instantaneous C/I measurement. In one aspect, the default value of $\beta$ is 0.5. After computing the new average WIDE C/I estimate, control proceeds to step 514

In step 514, the availability of a valid average wide area C/I estimate is checked. If a valid wide area average C/I estimate is not available, control flow proceeds to step 516, where the threshold registers are reset to default values for the wide area channels. Otherwise, control proceeds to step 518.

In step 518, WTPC based wide area channel estimate thresholds are dynamically adjusted in consideration of current channel conditions. In one aspect, for simplicity of implementation, thresholds for the wide area channels are selected from a look up table based on the current wide area C/I average. In other aspects, thresholds are selected from a look up table based on the instantaneous wide area C/I estimate. In yet another aspect, thresholds are selected based on a weighted combination of the current wide C/I average and the instantaneous wide C/I estimate. Finally, the adaptable calculation parameters can also be dynamically adjusted. Adaptable calculation parameters comprise $\delta$, $\beta$.

In step 512, which is reached if the current wide C/I average was deemed stale in step 506, current wide C/I average values is reset. The current wide C/I average is initialized to equal the instantaneous wide C/I estimate calculated in step 504. Control flow resumes at step 514.

Figure 6:
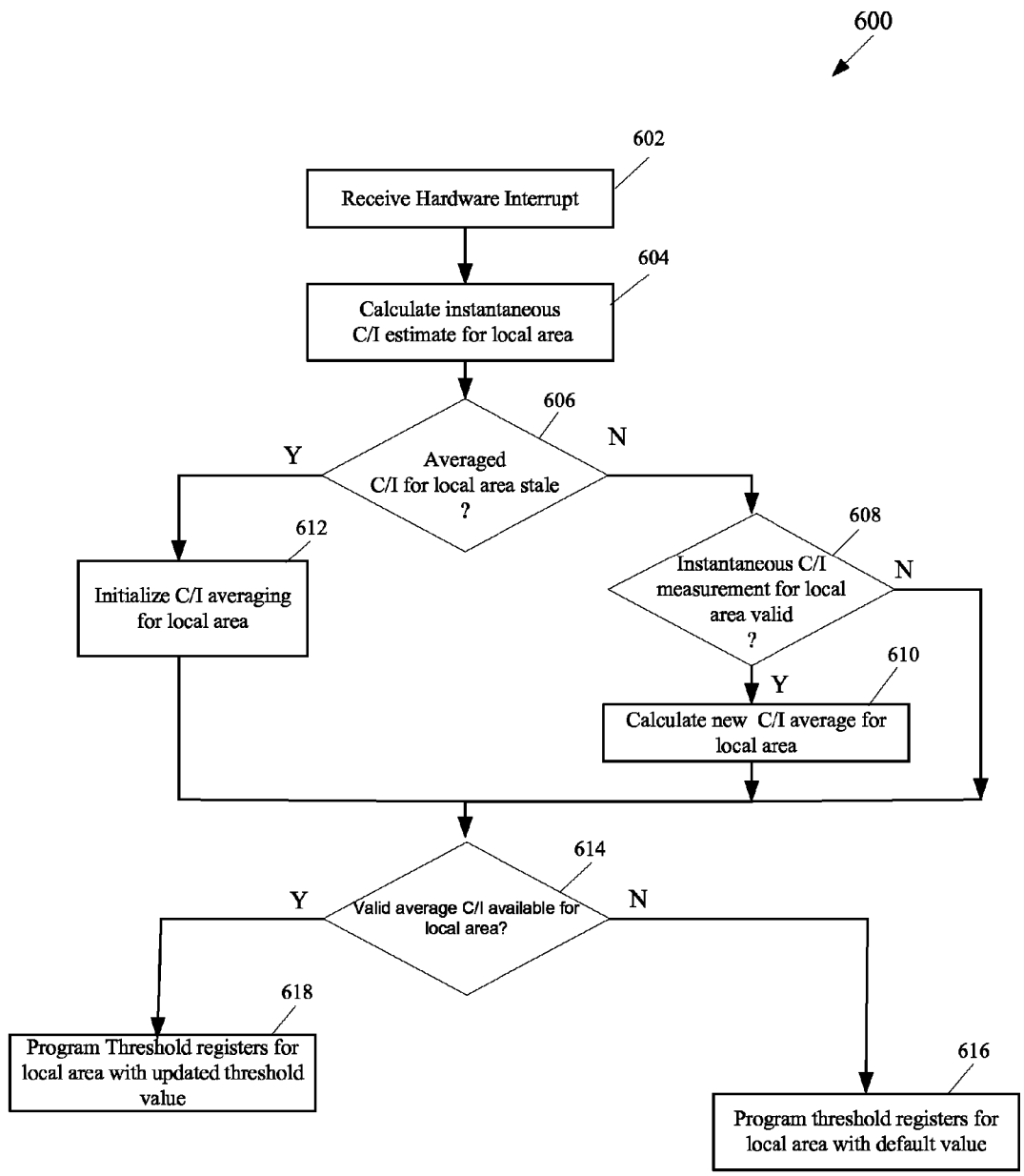
FIG. 6 shows an exemplary detailed method for an adaptive thresholding process optimizing threshold values for a local area channel based on TPC symbols.

FIG. 6 shows an exemplary detailed method for an adaptive thresholding process optimizing threshold values for a local area channel based on Local area transition pilot channel (LTPC) OFDM symbols. In step 602, a hardware interrupt indicates availability of new instantaneous channel estimation information. In an aspect, the hardware interrupt indicted the availability of a LTPC symbol in a superframe. Control flow proceeds to step 604.

In step 604, an instantaneous local C/I estimate for the local area is calculated at the time the LTPC OFDM symbol was received. In one aspect, the accumulated energy of the taps inside a sliding window of length W taps is computed. The minimum accumulated energy over all the positions of the sliding window is taken to correspond to interference. The instantaneous local C/I estimate may then be calculated as $$I = a \sum_{n=n_0}^{n_0+W-1} |h_n|^2$$

$$\frac{C}{I} = \frac{R}{I} - 1$$

where $|h_n|^2$ is the energy in n-th tap of the channel estimate, $n_0$ no corresponds to the position of the window with the minimum accumulated energy, α is a scale factor and R is the total signal and interference energy as measured by the AGC. After the instantaneous local C/I estimate is computed, Control flow proceeds to step 606.

In step 606, the current local C/I average produced from previously calculated instantaneous local C/I estimates is validated in time to ensure freshness. In one aspect, if the instantaneous local C/I estimate calculated in step 604 is the first estimate after power-up or the difference between the current superframe time ($t_n$) and the time corresponding to the last superframe ($t_{n-1}$) is greater than a staleness threshold (δ), the current local C/I average is deemed stale due to the likelihood of changed channel conditions. The current local C/I average may be stale if $$t_n - t_{n-1} > \delta.$$

In one aspect, δ=5 seconds by default. If the current local C/I average is stale, control flow proceeds to step 612 where the current local C/I average is reset. Otherwise, control flow proceeds to 608 for further processing of the instantaneous local C/I estimate.

In step 608, the instantaneous channel estimation energy information obtained in step 606 may be further validated further to ensure that the interference estimate (I) is non-zero. If the instantaneous local C/I estimate is valid, control flow proceeds to step 610 where the instantaneous local C/I estimate is included in the current local C/I average. Otherwise, the local C/I estimate is not included in the current local C/I average and control flow proceeds to step 614.

In step 610, the instantaneous local C/I estimate is included in the current average local C/I. In one aspect, the current local C/I average is calculated as $$C/I_{avg,new} = (1-\beta) \times C/I_{avg,old} + \beta \times C/I$$

where, β is a programmable weighting parameter that takes on values between 0 and 1 depending on the reliability of the instantaneous local C/I estimate. Maintaining a weighted local C/I average is advantageous because the instantaneous local C/I estimate derived from the LTPC symbol cannot reflect channel condition variations during the rest of the frame. Here, we have an instantaneous measurement for local C/I for the current frame and a local C/I average value accumulated over multiple frames. β is the amount of weight placed on the instantaneous local C/I measurement, or the amount of confidence in the instantaneous local C/I measurement. In one aspect, the default value of β is 0.5. After computing the new average local C/I estimate, control proceeds to step 614

In step 614, the availability of a valid average local area C/I estimate is checked. If a valid local area average local C/I estimate is not available, control flow proceeds to step 616, where the threshold registers are reset to default values for the local area channels. Otherwise, control proceeds to step 618.

In step 618, LTPC based local area channel estimate thresholds are dynamically adjusted in consideration of current channel conditions. In one aspect, for simplicity of implementation, thresholds for the local area channels are selected from a look up table based on the current local area C/I average. In other aspects, thresholds are selected from a look up table based on the instantaneous local area local C/I estimate. In yet another aspect, thresholds are selected based on a weighted combination of the current local C/I average and the instantaneous local C/I estimate. Finally, the adaptable calculation parameters can also be dynamically adjusted. Adaptable calculation parameters comprise δ, β.

In step 612, which is reached if the current local C/I average was deemed stale in step 606, current local C/I average values is reset. The current local C/I average is initialized to equal the instantaneous local C/I estimate calculated in step 604. Control flow resumes at step 614.

OFDM Receiver

Figure 7:
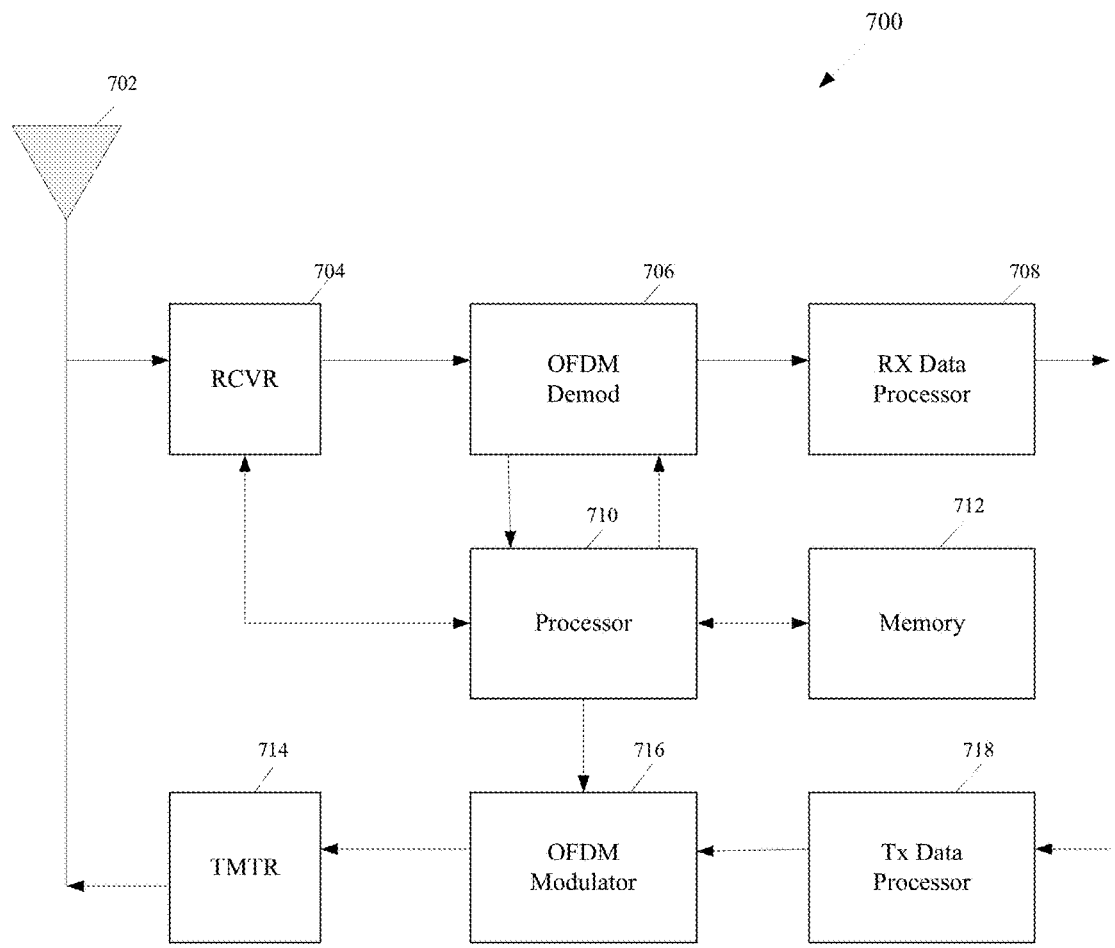
FIG. 7 is an exemplary simplified functional block diagram of an OFDM receiver having adaptive thresholding processing capability.

FIG. 7 is an exemplary simplified functional of block diagram of an OFDM receiver having adaptive thresholding processing based on received channel conditions in a spectrally shaped OFDM system. Antenna 702 receives a transmitted signal and provides a received signal to a receiver unit (RCVR) 704. Receiver unit 704 conditions (e.g., filters, amplifies, and frequency downconverts) the received signal and digitizes the conditioned signal to obtain samples. An OFDM demodulator 706 strips the cyclic prefix appended to each OFDM symbol, transforms each received stripped symbol to the frequency domain using an N-point FFT, obtains N received symbols for the N subbands for each OFDM symbol period, and provides received WIC, TPC, PPC and other symbols to a processor 710 for channel estimation.

OFDM demodulator 706 further receives a frequency response estimate for the received signal from processor 710, performs data demodulation on the received data symbols to obtain data symbol estimates (which are estimates of the transmitted data symbols), and provides the data symbol estimates to an RX data processor 708. RX data processor 708 demodulates (i.e., symbol demaps), deinterleaves, and decodes the data symbol estimates to recover the transmitted traffic data.

Processor 710 obtains the received WIC or other channel estimation symbols for the active channel and performs channel estimation. The adaptive thresholding processes based on channel conditions described herein may be implemented by suitable instructions operating on the processor 710 and memory 712 of Receiver 700, but is certainly not limited to such an implementation. The processor 710 is connected to memory 712 having code or instructions directing the processor 710 to provide adaptive thresholding. Memory 712 may comprise instructions for calculating instantaneous channel estimates, identifying network self interference and deriving dynamic thresholds from the instantaneous channel estimate and weighted average channel estimation. The memory 712 may comprise RAM memory, flash memory, ROM memory, EPROM memory, EEPROM memory, registers, a hard disk, a removable disk, a CD-ROM, or any other form of storage medium or computer readable media known in the art.

In an exemplary aspect, the processor 710 executes instructions stored in memory 712 according to the steps of FIGS. 3-4 to provide dynamic adaptive thresholding based on measured channel conditions. The methodologies described in FIGS. 3-4 may be implemented by various means depending upon the application. For example, these methodologies may be implemented in hardware, firmware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

Firmware and/or software implementations of the methodologies described in FIGS. 3-4 may be implemented with modules (e.g., procedures, functions, and so on) that perform the functions described herein. For example, software codes may be stored in a memory, for example the memory 712 of the Receiver 700, and executed by a processor, for example the processor 710 of the Receiver 700. Memory may be implemented within the processor 710 or external to the processor 710. As used herein the term "memory" refers to any type of long term, short term, volatile, nonvolatile, or other memory and is not to be limited to any particular type of memory or number of memories, or type of media upon which memory is stored.

Any machine or computer readable medium tangibly embodying instructions may be used in implementing the methodologies described herein. In an exemplary aspect, the processor 710 executes instructions stored in a computer readable medium according to the steps of FIGS. 3-4 to provide adaptive thresholding processes.

TX data processor 718 processes traffic data and provides data symbols for transmission. An OFDM modulator 716 receives and multiplexes the data symbols with pilot symbols, performs OFDM modulation, and provides a stream of OFDM symbols to transmitter unit 714. The pilot symbols may also be multiplexed with the data symbols using TDM. A transmitter unit 714 then processes the stream of OFDM symbols to generate an uplink signal, which is transmitted via antenna 702 to an access point.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of channel estimation in an Orthogonal Frequency Division Multiplex (OFDM) system comprising:
   determining a channel impulse response having a plurality of taps;
   calculating a signal energy to interference energy ratio (C/I) estimate using a processor, wherein the calculated C/I estimate is a function of an instantaneous C/I estimate and a weighted average C/I estimate;
   deriving a dynamic threshold based on the calculated C/I estimate, wherein the dynamic threshold comprises dynamic threshold energy;
   discarding taps having signal energy values below the dynamic threshold; and
   generating a channel frequency response estimate from remaining taps.

2. The method of claim 1 wherein the calculated C/I estimate is obtained from at least one of wide area identifier (WIC) symbols local area identifier (LIC) symbols, data symbols, time division multiplexed (TDM) pilots, or transition pilot channel (TPC) symbols.

3. The method of claim 1 wherein separate calculated C/I estimates are obtained for wide area and local area channels respectively.

4. The method of claim 1 wherein the weighted average C/I estimate is calculated as $C/I_{avg,new} = (1-\beta) \times C/I_{avg,old} + \beta \times C/I_{instantaneous}$, wherein $C/I_{avg,old}$ is a previously calculated C/I average, wherein $\beta$ is a programmable weighting parameter, and wherein $C/I_{instantaneous}$ is the instantaneous C/I estimate.

5. The method of claim 4 wherein $\beta$ takes on values between 0 and 1 depending on a reliability of the instantaneous C/I estimate.

6. The method of claim 1 further comprising adjusting the dynamic threshold to compensate for network self interference.

7. The method of claim 6 wherein adjusting the dynamic threshold to compensate for network self interference comprises comparing primary instantaneous wide area identifier (WID) and local area identifier (LID) energies to secondary WID and LID average energies to identify network self interference.

8. The method of claim 7 wherein the secondary WID average energy is calculated as $$WID_{average\ energy,new} = (1-\gamma) \times WID_{average\ energy,old} + \gamma\ WID_{instatananeous\ energy}$$

wherein $\text{WID}_{\text{average energy,old}}$ is a previously calculated average WID energy, wherein γ is an adaptable parameter adjusted for prevailing channel conditions, and wherein $\text{WID}_{\text{instantaneous energy}}$ is an instantaneous WID energy.

9. The method of claim 7 wherein the secondary LID average energy is calculated as $$LID_{average\ energy,new} = (1-\gamma) \times LID_{average\ energy,old} + \gamma LID_{instantaneous\ energy}$$

wherein $LID_{average\ energy,old}$ is a previously calculated average LID energy, wherein γ is an adaptable parameter adjusted for prevailing channel conditions, and wherein $LID_{instantaneous\ energy}$ is an instantaneous LID energy.

10. The method of claim 1 wherein the deriving a dynamic threshold based on the C/I estimate comprises selecting a threshold from a look up table according to the calculated C/I estimate.

11. The method of claim 1 wherein the deriving a dynamic threshold based on the calculated C/I estimate comprises selecting a threshold based on a computation performed by a receiver.

12. The method of claim 1 where different thresholds are used for wide area channel estimation and local area channel estimation.

13. An Orthogonal Frequency Division Multiplex (OFDM) receiver, the receiver comprising:
an antenna for receiving a transmitted signal and providing the received signal to a receiver unit;
the receiver unit for conditioning the received signal by filtering, amplifying, and frequency down converting the received signal, and digitizing the conditioned signal to provide samples and symbols to an orthogonal frequency division multiplex (OFDM) demodulator;
the OFDM demodulator for transforming received symbols to the frequency domain and providing the symbols to a processor for channel estimation;
the processor for processing the received symbols to determine a channel impulse response having a plurality of taps, calculating a scaled signal energy to interference energy ratio (C/I) estimate, deriving a dynamic threshold energy based on the calculated C/I estimate, discarding taps having signal energy values below the dynamic threshold energy, and generating a channel frequency response estimate from remaining taps, wherein the calculated C/I estimate is a function of an instantaneous C/I estimate and a weighted average C/I estimate.

14. The receiver of claim 13 wherein separate calculated C/I estimates are obtained for wide area and local area channels respectively.

15. An apparatus for channel estimation in an Orthogonal Frequency Division Multiplex (OFDM) system comprising:
means for determining a channel impulse response having a plurality of taps;
means for calculating a signal energy to interference energy ratio (C/I) estimate, wherein the calculated C/I estimate is a function of an instantaneous C/I estimate and a weighted average C/I estimate;
means for deriving a dynamic threshold energy based on the calculated C/I estimate;
means for discarding taps having signal energy values below the dynamic threshold; and means for generating a channel frequency response estimate from remaining taps.

16. The apparatus of claim 15 wherein separate calculated C/I estimates are obtained for wide area and local area channels respectively.

17. A non-transitory computer readable medium encoded with a computer program configured to direct a processor to perform the steps comprising:
determining a channel impulse response having a plurality of taps;
calculating a signal energy to interference energy ratio (C/I) estimate, wherein the calculated C/I estimate is a function of an instantaneous C/I estimate and a weighted average C/I estimate;
deriving a dynamic threshold energy based on the calculated C/I estimate;
discarding taps having signal energy values below the dynamic threshold energy; and
generating a channel frequency response estimate from remaining taps.

18. The non-transitory computer readable medium of claim 17 wherein separate calculated C/I estimates are obtained for wide area and local area channels respectively.

* * * * *